(12) United States Patent
Delling et al.

(10) Patent No.: US 8,494,771 B2
(45) Date of Patent: Jul. 23, 2013

(54) JOURNEY PLANNING IN PUBLIC TRANSPORTATION NETWORKS

(75) Inventors: Daniel Delling, Mountain View, CA (US); Andrew V. Goldberg, Redwood City, CA (US); Thomas Pajor, Karlsruhe (DE); Renato F. Werneck, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 82 days.

(21) Appl. No.: 13/226,510

(22) Filed: Sep. 7, 2011

(65) Prior Publication Data
US 2013/0060468 A1    Mar. 7, 2013

(51) Int. Cl.
*G01C 21/00*    (2006.01)

(52) U.S. Cl.
USPC .......................................................... 701/533

(58) Field of Classification Search
USPC .................... 701/532, 537, 538, 540, 533
See application file for complete search history.

(56) References Cited

U.S. PATENT DOCUMENTS

| | | | |
|---|---|---|---|
| 2004/0236811 A1 | 11/2004 | Koskas | |
| 2006/0161337 A1 | 7/2006 | Ng | |
| 2010/0268447 A1 | 10/2010 | Griffiths | |
| 2011/0112759 A1* | 5/2011 | Bast et al. | 701/202 |

OTHER PUBLICATIONS

Jigang, et al., "Practical algorithm for shortest path on large networks with time-dependent edge-length", Retrieved at <<http://ieeexplore.ieee.org/stamp/stamp.jsp?arnumber=05485321>>, 2nd International Conference on Computer Engineering and Technology, vol. 2, Apr. 16-18, 2010. pp. V2-57-V2-60.

Pallottino, et al., "Shortest Path Algorithms in Transportation models: classical and innovative aspects", Retrieved at <<http://citeseerx.ist.psu.edu/viewdoc/download?doi=10.1.1.36.4398&rep=rep1&type=pdf>>, Technical Report : TR-97-06, University of Pisa, Apr. 14, 1997, pp. 33.

Chabini, Ismail., "Discrete Dynamic Shortest Path Problems in Transportation Applications: Complexity and Algorithms with Optimal Run Time", Retrieved at <<http://citeseer.ist.psu.edu/viewdoc/download;jsessionid=8A0ADCEB2AE5A3BE0C1931E41B9B6061?doi=10.1.1.41.1786&rep=rep1&type=pdf>>, Transportation Research Record, vol. 1645, No. 1, 1997, pp. 1-9.

Zhao, et al., "Transit Network Optimization—Minimizing Transfers and Optimizing Route Directness", Retrieved at <<http://citeseerx.ist.psu.edu/viewdoc/download?doi=10.1.1.170.8878&rep=rep1&type=pdf>>, Journal of Public Transportation, vol. 7, No. 1, 2004, pp. 63-82.

Delling, et al., "Parallel Computation of Best Connections in Public Transportation Networks", Retrieved at<<http://i11www.iti.uni-karlsruhe.de/extra/publications/dkp-pcbcp-tr-09.pdf>>, IEEE International Symposium on Parallel & Distributed Processing, Apr. 19-23, pp. 17.

(Continued)

*Primary Examiner* — James Trammell
*Assistant Examiner* — Michael D Lang
(74) *Attorney, Agent, or Firm* — Microsoft Corporation

(57) ABSTRACT

Optimum journeys in public transportation networks are determined. The determination of Pareto optimal journeys from one stop to another stop in a public transportation network uses the criteria travel time and minimum transfers. A technique for bi-criteria journey planning using the aforementioned criteria in public transportation networks operates in rounds (K rounds at most), where after round k ($k \leq K$), arrival times are computed for the stops that can be reached with up to k trips.

20 Claims, 6 Drawing Sheets

OTHER PUBLICATIONS

Abraham, et al., "A Hub-based Labeling Algorithm for Shortest Paths in Road Networks", Retrieved at <<http://research.microsoft.com/pubs/145689/hl-sea.pdf>>, Proceedings of the 10th international conference on Experimental algorithms, 2011, pp. 1-12.

Bast, et al, "Fast Routing in Very Large Public Transportation Networks using Transfer Patterns", Retrieved at <<http://ad.informatik.uni-freiburg.de/papers/transferpatterns.pdf>>, Proceedings of the 18th annual European conference on Algorithms: Part I , 2010, pp. 1-16.

Berger, et al., "Accelerating Time-dependent Multi-criteria Timetable Information is Harder than Expected", Retrieved at <<http://drops.dagstuhl.de/opus/volltexte/2009/2148/pdf/BergerAnnabell.2148.pdf>>, 9th Workshop on Algorithmic Approaches for Transportation Modeling, Optimization, and Systems, 2009, pp. 1-21.

Delling, et al., "Engineering Time-expanded Graphs for Faster Timetable Information" Retrieved at <<http://i11www.iti.uni-karlsruhe.de/extra/publications/dpw-etegf-09.pdf>>, 2008, pp. 1-21.

Delling, et al., "Engineering Route Planning Algorithms", Retrieved at <<http://i11www.iti.uni-karlsruhe.de/extra/publications/dssw-erpa-09.pdf>>, Algorithmics of Large and Complex Networks, 2009, pp. 118-139.

Dijkstra, E.W., "A Note on Two Problems in Connexion with Graphs", Retrieved at <<http://monet.skku.ac.kr/course_materials/undergraduate/al/lecture/2006/Dijkstra.pdf>>, Numerische Mathematik, vol. 1, No. 1, Dec. 1, 1959, pp. 269-271.

Frede, et al., "Efficient On-trip Timetable Information in the Presence of Delays", Retrieved at <<http://drops.dagstuhl.de/opus/volltexte/2008/1584/pdf/08002.Frede.1584.pdf>>, 8th Workshop on Algorithmic Approaches for Transportation Modeling, Optimization, and Systems, 2008, pp. 1-16.

Pyrga, et al., "Efficient Models for Timetable Information in Public Transportation Systems", Retrieved at <<http://www.ceid.upatras.gr/faculty/zaro/pub/jou/J27-PSWZ-ACM-JEA-Vol12-N2.4-2008.pdf>>, ACM Journal of Experimental Algorithmics, vol. 12, Article No. 2.4, Jun. 2008, pp. 1-39.

Bast, Hannah, "Car or Public Transport—Two Worlds", Efficient Algorithms, vol. 5760 of Electronic Notes in Theoretical Computer Science, 2009, pp. 355-367.

Disser, et al., "Multi-Criteria Shortest Paths in Time-Dependent Train Networks", Proceedings of the 7th Workshop on Experimental Algorithms, vol. 5038 of Lecture Notes in Computer Science, Jun. 2008, pp. 347-361.

Hannemann, et al., "Finding All Attractive Train Connections by Multi-Criteria Pareto Search", In Algorithmic Methods for Railway Optimization, vol. 4359 of Lecture Notes in Computer Science, 2007, pp. 246-263.

\* cited by examiner

JOURNEY PLANNING IN PUBLIC TRANSPORTATION NETWORKS

BACKGROUND

Motivated by map services, there has been an abundance of research on determining journeys in transportation networks. Much of the research has focused on computing driving directions on road networks. Existing computer programs known as road-mapping programs provide digital maps, often complete with detailed road networks down to the city-street level. Typically, a user can input a location and the road-mapping program will display an on-screen map of the selected location. Several existing road-mapping products typically include the ability to calculate a best route between two locations. In other words, the user can input two locations, and the road-mapping program will compute the travel directions from the source location to the destination location. The directions are typically based on distance, travel time, etc. Computing the best route between locations may require significant computational time and resources.

Some road-mapping programs compute shortest paths using variants of a well known method attributed to Dijkstra. Note that in this sense "shortest" means "least cost" because each road segment is assigned a cost or weight not necessarily directly related to the road segment's length. By varying the way the cost is calculated for each road, shortest paths can be generated for the quickest, shortest, or preferred routes. Dijkstra's original method, however, is not always efficient in practice, due to the large number of locations and possible paths that are scanned. Instead, many known road-mapping programs use heuristic variations of Dijkstra's method.

More recent developments in road-mapping algorithms utilize a two-stage process comprising a preprocessing phase and a query phase. During the preprocessing phase, the graph or map is subject to an off-line processing such that later real-time queries between any two destinations on the graph can be made more efficiently. The preprocessing phase may take several minutes (or even hours) and computes some auxiliary data, which is later used to accelerate queries. Known examples of preprocessing algorithms use geometric information, hierarchical decomposition, and A* search combined with landmark distances.

Routing in public transportation networks (e.g., planning a journey between two points in a public transportation system starting at a given time) may seem superficially similar, but this problem turns out to be significantly more difficult to deal with. The techniques developed for road networks are of little help for public transit. There are several reasons for this. First, public transit networks do not have the strong hierarchical properties of road networks, where nearly all long distance journeys converge into major freeways. Second, public transportation networks are inherently time-dependent (e.g., buses and trains have schedules which are taken into account when determining the shortest or least cost journey). Third, in addition to travel times, the number of transfers made is also to be considered. This is often done by reporting more than one journey. Additionally, public transit systems are dynamic, with frequent delays and cancellations. Unlike in road networks, small delays can have a huge impact on the resulting routes, because a missed connection may result in waiting at a transit station or stop (e.g., a train station or bus stop) for several hours. There are no conventional techniques known that can handle efficiently the above mentioned features on a transit network of a large metropolitan area.

SUMMARY

Techniques are provided for determining optimum journeys in public transportation networks. The determination of Pareto optimal journeys from one stop to another stop in a public transportation network uses criteria such as travel time and minimum transfers.

In an implementation, a technique for bi-criteria journey planning in public transportation networks operates in rounds (K rounds at most), where after round k ($k \leq K$), arrival times are computed for the stops that can be reached with up to k trips.

In an implementation, optimization techniques may be used. Such techniques include iterating over routes, marking, tightening stopping criteria, pruning, parallelism, and post-processing to minimize the total time in transit.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
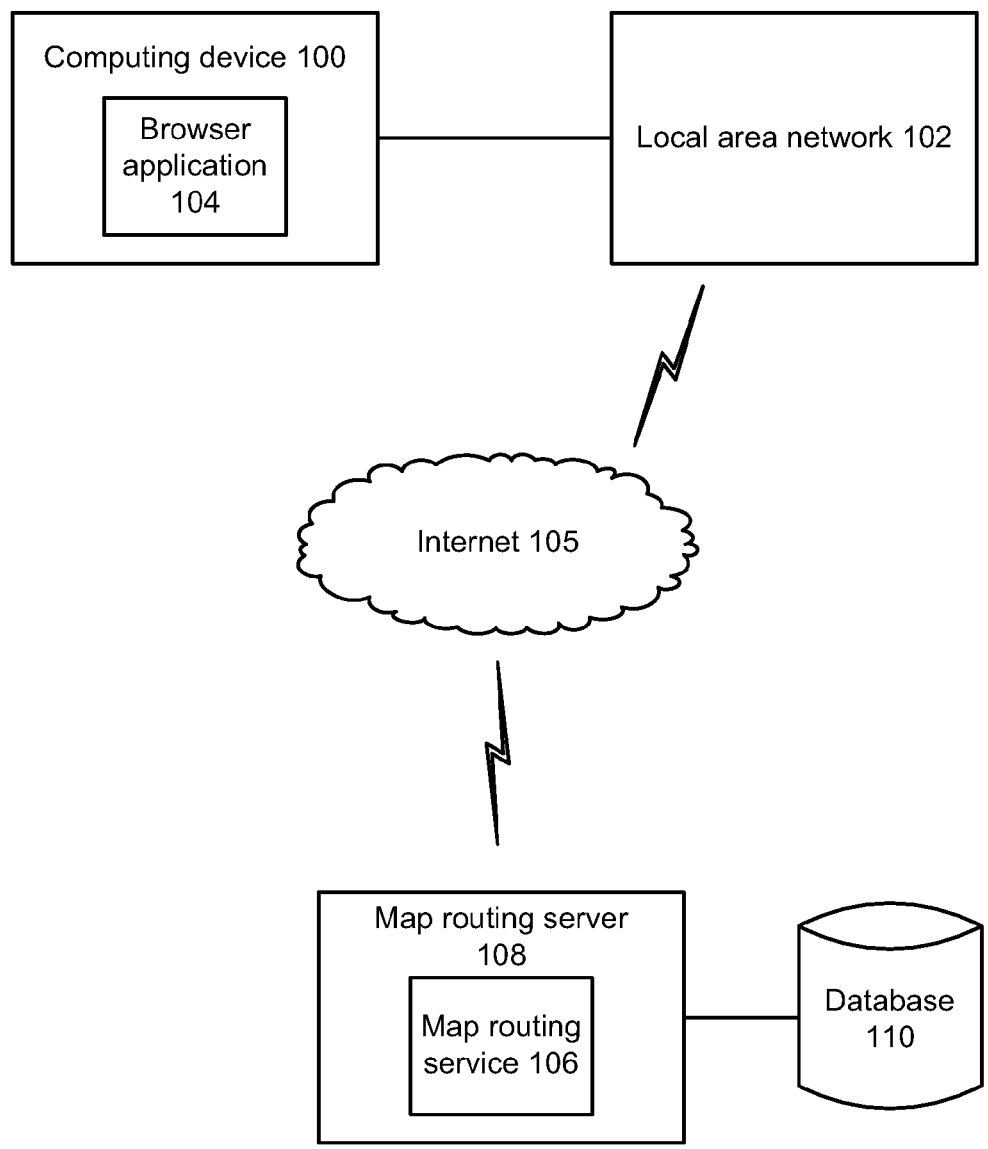
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), smart phone, cell phone, or any WAP-enabled device or any other computing device capable of interfacing directly or indirectly with a network. An example computing device 100 is described with respect to the computing device 900 of FIG. 9, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a map routing service 106, running on a map routing server 108. The map routing server 108 hosts a database 110 of transportation stops, physical locations, and street addresses, along with routing information such as timetables, transfer information, transportation information, location information, adjacencies, distances, speed limits, and other relationships between the stored locations.

A user of the computing device 100 typically enters source and destination locations as a query request through the browser application 104. The map routing server 108 receives the request and produces a shortest path among the locations stored in the database 110 for reaching the destination location from the source location. The map routing server 108 then sends that shortest path (e.g., a listing of Pareto optimal journeys between the two locations) back to the requesting computing device 100. Alternatively, the map routing service 106 is hosted on the computing device 100, and the computing device 100 need not communicate with a local area network 102.

The earliest arrival with bounded transfers (EABT) problem arises in journey planning for public transit (also referred to herein as "public transportation"). Given two stops $v_s$ and $v_t$ (a source location and a destination location, respectively), and a nonnegative integer K, the EABT is defined to be the problem of finding a valid journey from $v_s$ to $v_t$ such that the arrival time at $v_t$ is the earliest possible, and subject to the additional constraint that the total number of individual trips taken in the path is not greater than K (i.e., the total number of transfers is at most K−1). There are many uses for an algorithm that solves the EABT problem, and the techniques, processes, and systems described herein are not meant to be limited to maps.

During the query phase, a user may wish to find a valid journey between two particular stops subject to the two criteria set forth above. The origination stop may be known as the source location, labeled $v_s$, and the destination stop may be known as the destination location (or target stop), labeled $v_t$. The user may then specify their starting point (i.e., source location $v_s$) and their destination location $v_t$.

Existing techniques to solve the (P)EABT problem are usually based on processing stops one by one in time order (i.e., stops reached sooner are processed first). This requires a priority queue. Since a stop may be reached at different times depending on the number of transfers, the same stop may be processed several times. If only the earliest arrival time is to be determined, regardless of the number of transfers, then a time-dependent version of Dijkstra's algorithm may be used, which is guaranteed process each stop at most once.

More particularly, conventionally, algorithms for routing on public transit networks use the sets of trips, routes, and stops to build a graph, then run some variant of Dijkstra's algorithm. This works well enough when minimizing only journey times: Dijkstra's algorithm simply computes the single fastest way of getting to each stop in the graph. Algorithms get significantly less practical when besides travel times the number of transfers is also considered. In this case, the "best" way of getting to any intermediate stop is no longer unique. It may be worth taking a later bus through the stop if it continues towards the target (and earlier buses go elsewhere).

Unlike previous approaches, the techniques described herein are not based on Dijkstra's algorithm, and do not need a priority queue. Instead of working on one stop at a time, the techniques described herein use rounds and consider both the total journey time (arriving earlier is better) and the total number of transfers (fewer transfers are better). The techniques determine and provide the Pareto optimal paths according to both criteria. As used herein, Pareto optimal is defined as a set of paths that are not dominated. For example, path A dominates path B if path A takes no more time and makes no more transfers than path B. If multiple paths are tied with respect to both criteria (time and number of transfers), only one of those paths may be returned by the techniques described herein.

Paths are computed with up to K trips (K−1 transfers) from a source location $v_s$ to a destination location $v_t$, leaving no earlier than a time τ. Rounds are used (K rounds at most), where after round k, arrival times are computed for those stops that can be reached with up to k trips. Round k determines the best path from the source to every stop while making at most k−1 transfers (or determines that no such path exists). In other words, round k computes the fastest way of getting to every stop with at most k−1 transfers (i.e., by taking at most k trips), and it is noted that some stops may not be reachable at all. On a typical transportation network, a small number of rounds is enough to determine all Pareto optimal paths.

In an implementation, inputs are a schedule-based timetable, a source location (or starting point) $v_s$, a destination location (or target point) $v_t$, a departure time τ, and an upper bound K on the number of transfers (i.e., interchanges of trains, buses, etc.) allowed. The output comprises, for each value k≦K, a journey that leaves the source location $v_s$ no earlier than departure time τ, arrives at the destination location $v_t$ as early as possible, and has no more than k−1 transfers. Solving EABT may be used to determine a journey using a minimum number of transfers, and may output a set of Pareto optimal journeys, allowing users to trade off arrival times and number of transfers. As described further herein, a round-based technique is used to solve EABT, based on the notion of relaxing routes in the network. In each round, arrival times are computed for the stops along routes that can be reached by exactly k−1 transfers. The techniques described herein are not Dijkstra-based, look at each route in the timetable at most once per round, and can be made faster with optimizations such as pruning rules and parallelization using multiple cores as described further below.

In an implementation, a public transportation network is modeled as follows. The input to the algorithm is a schedule-based timetable that comprises a set of stops in the network, the set of trips in the network during a certain time period, the set of routes in the network, and the set of allowed transfers. More particularly, $V=\{v_0, v_1, v_2, \ldots, v_{|V|-1}\}$ is the set of stops in the network. Each stop corresponds to a distinct location where one can board or get off a vehicle (bus, tram, train, etc.). Typical examples are bus stops and train platforms. $T=\{t_0, t_1, t_2, \ldots, t_{|T|-1}\}$ is the set of trips in the network during a certain time period (typically a day or a week). A trip corresponds to the sequence of stops a specific vehicle (train, bus, subway, etc.) visits along a line. It has an initial stop, a final stop, and possibly several stops in between, where it may drop off or take passengers. Each stop in the trip also has associated arrival and departure times. $R=\{r_0, r_1, r_2, \ldots, r_{|R|-1}\}$ is the set of routes in the network. A route consists of all trips that share the exact same sequence of stops. A typical example is a bus line in a bus network: a single route may correspond to several trips (all following the same trajectory) during the day. Typically, there are many more trips than routes. $C=\{c_0, c_1, c_2, \ldots, c_{|C|-1}\}$ is the set of transfers. Transfers are used to incorporate walking between stops (usually within near vicinity) to allow interchanges between transportation vehicles. Each transfer consists of exactly two stops $v_i$ and $v_j$ with an associated constant walking time $l(v_i, v_j)$.

In an implementation, the output produced by a route planning technique on a schedule-based timetable is a set of journeys $J=\{j_0, \ldots, j_{|J|-1}\}$. For example, each journey in this set can correspond to an alternative travel itinerary for a single query. A journey is defined as a sequence of trips and transfers in the order of travel. In addition, each trip in the sequence is associated with two stops, corresponding to the pick-up and drop-off points. Moreover, to form valid output, a journey is consistent in the sense that for any two subsequent items (trips or transfers) along the journey their stops have to match and the second item's departure time must be after the first item's arrival time. Note that a journey with k trips has exactly k−1 transfers.

Figure 2:
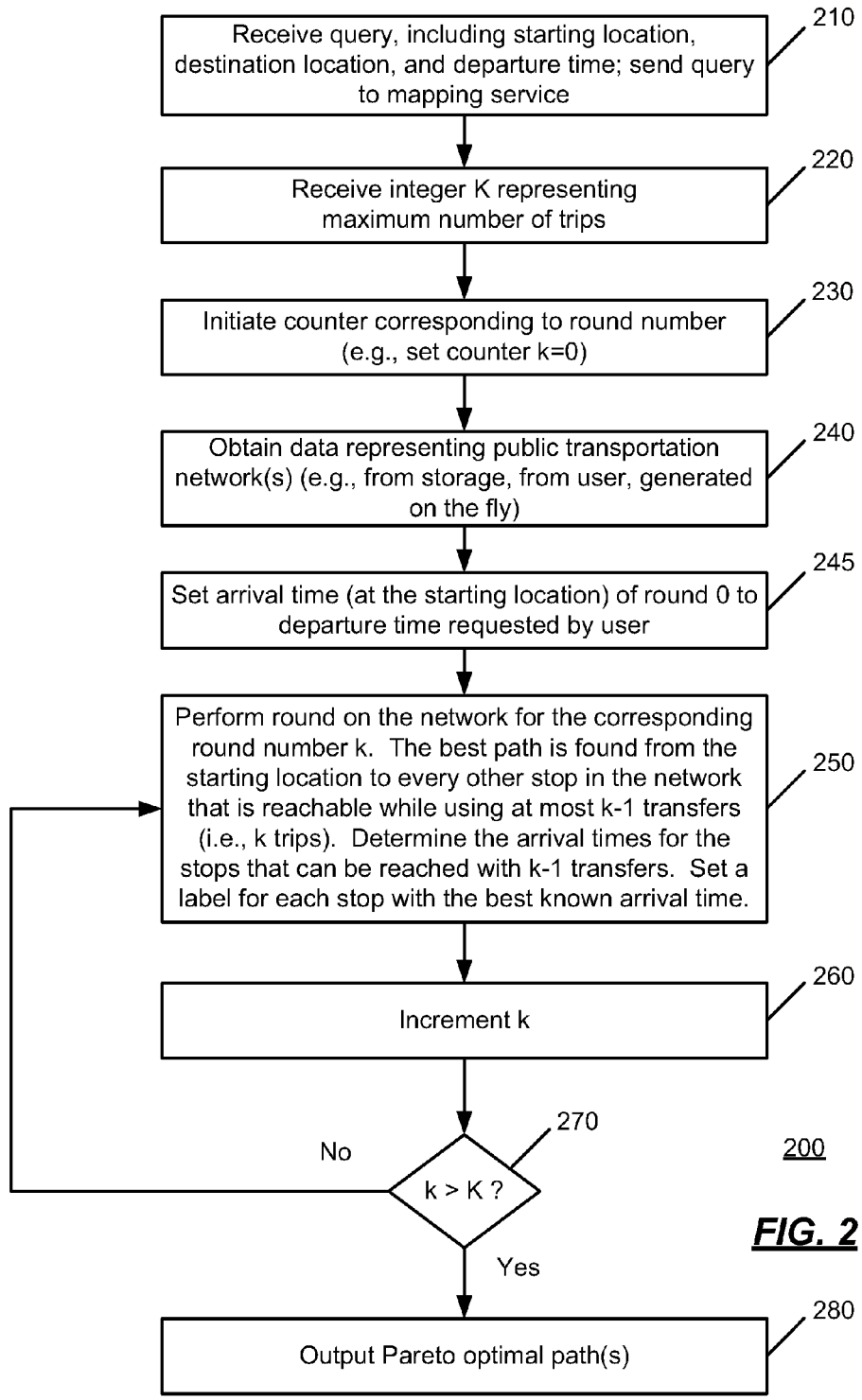
FIG. 2 is an operational flow of an implementation of a method of determining journeys in public transportation networks.

FIG. 2 is an operational flow of an implementation of a method 200 of determining journeys in public transport networks. At 210, a query is received, e.g., from a user. The query may include a source location, a destination location, and a departure time (e.g., an earliest departure time that the user would like to depart the source location). Thus, at query time, a user enters start and destination locations, respectively (e.g., using the computing device 100), and the query (e.g., the information pertaining to the start and destination stops) is sent to a mapping service (e.g., the map routing service 106).

At 220, an integer K representing the maximum number of trips is received (e.g., from the user or from storage, for example). At 230, a counter corresponding to a round number k is initiated. For example, k is set equal to zero.

At 240, the data representing a public transportation network is obtained, e.g., retrieved from storage or from the user, generated using timetables, etc. The data may represent more than one public transportation network, depending on the implementation. The techniques used herein take as input a network having stops (e.g., each stop can be a train or subway platform, a bus stop, etc.). In addition, information about trips and routes is used. Trips are consecutive stops of an individual bus or train, together with the scheduled departure and arrival times at each stop. A route is a collection of trips that have the same sequence of stops, possibly at different times of the day.

In an implementation, an algorithm takes as input the source location, the destination location, and the starting time. A goal is to find all non-dominated routes from the source to the destination (leaving at the starting time or later) according to two criteria: earliest arrival time and least number of transfers. As defined above, a route R1 is dominated by a route R2 if R1 neither arrives earlier nor makes fewer transfers. On a typical transportation network, the total number of such routes will be rather small, in particular because often the route with fewest transfers is the one with earliest arrival time.

The techniques work in rounds: round k is guaranteed to find the fastest path with up to k−1 transfers from the source to each stop (e.g., bus stop, train station, etc.) in the network. Each round consists of traversing each possible route at most once, and updating information on the stops along the route.

In an implementation, each stop v maintains a series of labels L(v,k) representing the best known arrival time at v with exactly k−1 transfers. These values are initially set to infinity, and L(v,k) is updated as appropriate during round k. To update these values during round k, the algorithm goes through each route at most once. When analyzing the route at round k, the algorithm implicitly considers all possible paths that use this route after their last (i.e., k−1'st) transfer (i.e., the k'th trip).

At 245, an initialization is performed to set the arrival time at the starting location of round 0 to the departure time requested by user. At 250, a round is performed for the corresponding round number k. For the round, the best path is found from the starting location to every other stop in the network that is reachable while using at most k−1 transfers (i.e., k trips). The arrival times are determined for the stops that can be reached with k−1 transfers, and a label is set for each stop with the best known arrival time.

At 260, k is incremented (e.g., increased by one) so that the subsequent round number is increased. It is determined at 270 whether k is greater than the maximum number of rounds K that are to be performed. If so, then at 280, the results (i.e., the Pareto optimal path(s)) that have been determined so far are outputted. The output may be provided to the user computing device or other device. If the new value of k (from 270) does not exceed K as determined at 280, then processing continues at 250 for the next round using the new value of k.

The routes can be analyzed in any order, and the techniques have no need for a priority queue. The algorithm does not need a preprocessing phase, and therefore can be used in dynamic scenarios as well: for example, trips can be added or modified (due to delays, for example) without requiring changes to the algorithm. As described further below, appropriate data structures ensure that routes can be efficiently traversed and labels can be efficiently updated. Additionally, the algorithm can incorporate one or more acceleration techniques that limit the number of routes that must be looked at. Each round can be processed in time linear in the input size.

In an implementation, each stop v is associated with a multilabel $L(v)=(\tau_0(v), \tau_1(v), \tau_2(v), \ldots, \tau_K(v))$, where $\tau_i(v)$ represents the earliest known arrival time at v when up to i trips are allowed. The values in the labels are initialized to infinity. Then $\tau_0(v_s)$ is set equal to $\tau$ (recall that $v_s$ is the source). It is noted that multiple source stops may be handled by setting $\tau_0(v)=\tau$ for every source stop v.

Additionally, the following invariant is maintained: at the beginning of round k (for $k \geq 1$), the first k entries in L(v) ($\tau_0(v)$ to $\tau_{k-1}(v)$) are correct, i.e., entry $\tau_i(v)$ represents the earliest arrival time at v using at most i trips. The remaining entries are set to $\infty$. The goal of round k is to compute $\tau_k(v)$ for all v. It does so in three stages, as described with respect to FIG. 3, for example.

Figure 3:
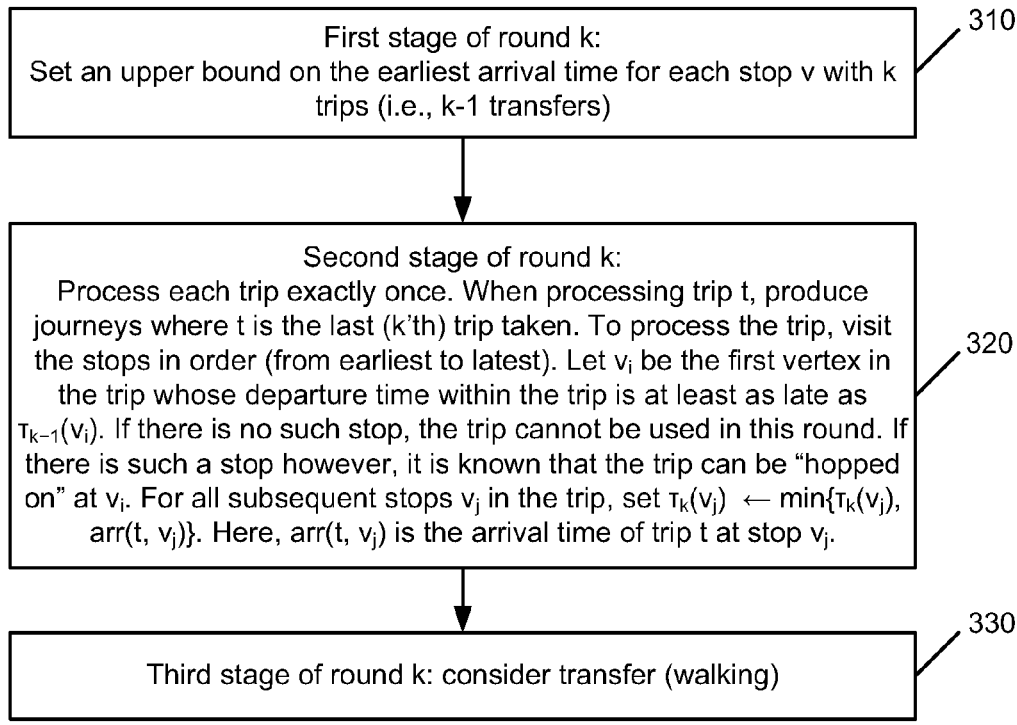
FIG. 3 is an operational flow of another implementation of a method of determining journeys in public transportation networks.

FIG. 3 is an operational flow of another implementation of a method 300 of determining journeys in public transportation networks. At 310, a first stage of round k is performed. The first stage of round k sets $\tau_k(v)=\tau_{k-1}(v)$ for all stops v. This stage sets an upper bound on the earliest arrival time at v with k trips.

At 320, a second stage of round k is performed. The second stage of round k includes processing each trip exactly once. When processing trip t, journeys are produced where t is the last (k'th) trip taken. To process the trip, the stops are visited in order (from earliest to latest). Let $v_i$ be the first stop in the trip whose departure time within the trip (denoted by $dep(t, v_i)$) is at least as late as $\tau_{k-1}(v_i)$. If there is no such stop, the trip cannot be used in this round. If there is such a stop however, it is known that the trip can be "hopped on" at $v_i$. (i.e., the trip can be used in determining a solution to the query). For all subsequent stops $v_j$ in the trip, set $\tau_k(v_j) \leftarrow \min\{\tau_k(v_j), arr(t, v_j)\}$. Here $arr(t, v_j)$ is the arrival time of trip t at stop $v_j$.

At 330, a third stage of round k is performed. The third stage of round k considers transfers (e.g., walking). For each transfer (v,w) out of each stop v to a stop w, it sets $\tau_k(w) \leftarrow \min\{\tau_k(w), \tau_k(v)+l(v,w)\}$. In an implementation, retrieval of the Pareto optimal paths may use data structures and/or parent pointers, described further herein with respect to FIGS. 7 and 8 for example.

The route planning technique may be improved using a variety of techniques, such as iterating over routes, marking, tightening stopping criteria, pruning, parallelism, and running the algorithm multiple times. These optimizations do not affect the correctness of the above described algorithm: the algorithm will still determine the Pareto optimal journeys to the destination location $v_t$.

In an implementation, the techniques described herein may iterate over routes instead of trips during the second stage of each round k. Explicitly traversing multiple trips of the same route r may be wasteful. To see why, consider a stop $v_i$ in r. From the previous round, $\tau_{k-1}(v_i)$ will have been computed (i.e., the earliest arrival time at v, with k–1 trips). If this journey is extended during round k using route r, it is known which trip from r is to be taken: the first trip t that leaves $v_i$ at time $\tau_{k-1}(v_i)$ or later. Earlier trips are not feasible, and later ones are dominated by t. Note that, for a stop $v_j$ that appears later along the route, it may actually be possible to take an earlier trip.

Figure 4:
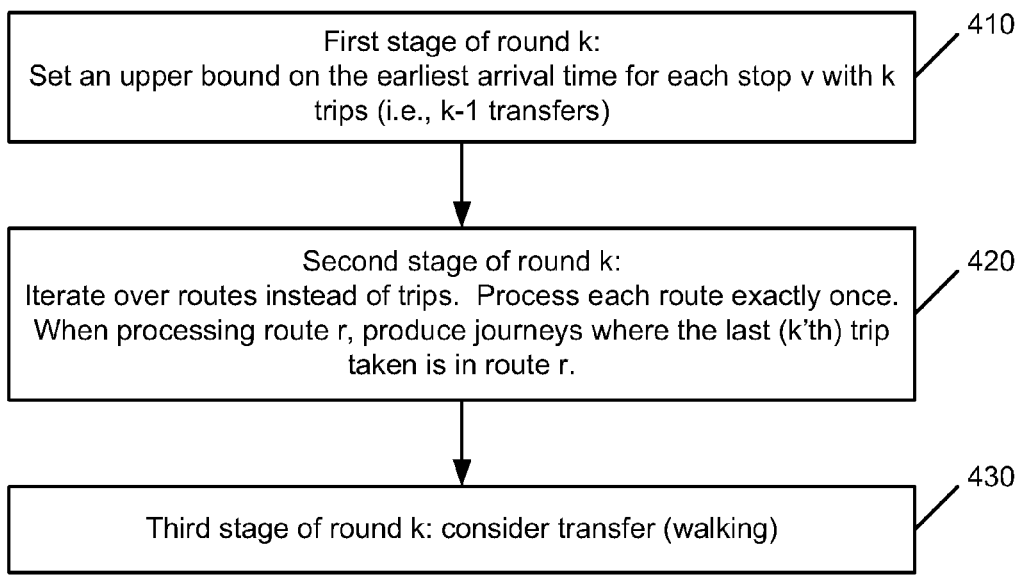
FIG. 4 is an operational flow of an optimization that may be used in an implementation of a method of determining journeys in public transportation networks, such as that of FIG. 3.

FIG. 4 is an operational flow of an optimization that may be used in an implementation of a method 400 of determining journeys in public transportation networks. The method 400 is similar to the method 300, but the second stage is different. The first stage, at 410 is similar to the first stage described above with respect to 310, and the third stage, at 430 is similar to the third stage described above with respect to 330, and their descriptions are omitted for brevity. The second stage, at 420, iterates over routes rather than trips as in 320.

In an implementation, at 420, the second stage of round k processes each route exactly once. Consider a route r, and let $T(r)=(t_1, t_2, \ldots, t_{|T(r)|-1})$ be the sequence of trips that follow route r, from earliest to latest. When processing route r, produce journeys where the last (k'th) trip taken is in route r. Let $et(r, v_i)$ be the earliest trip in route r that one can catch at $v_i$, i.e., the earliest trip t such that $dep(t, v_i) \geq \tau_{k-1}(v_i)$. Note that this trip may not exist, in which case $et(r, v_i)$ is undefined.

Figure 5:
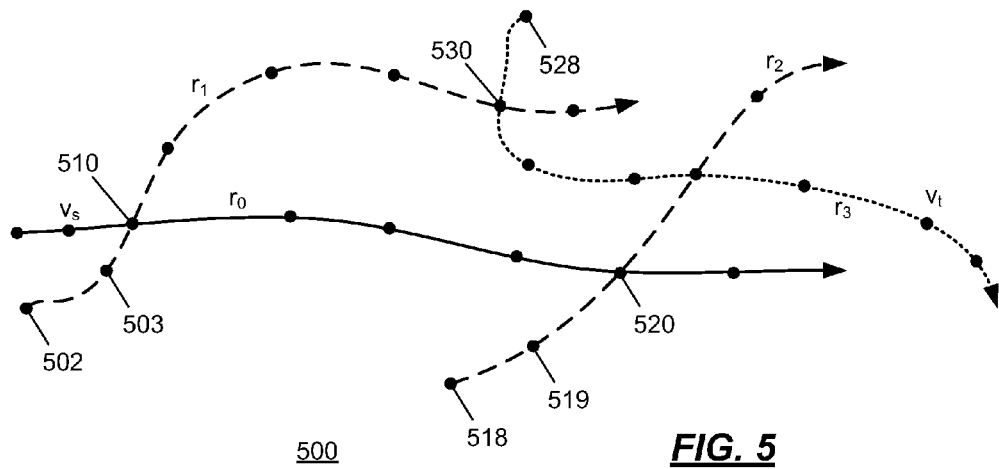
FIG. 5 is a diagram illustrating various routes that may be scanned during a query.

FIG. 5 is a diagram 500 illustrating various routes that may be scanned during a query, with a source location $v_s$ and a destination location $v_t$. Each stop on the routes is a stop on that particular route. As shown in the example, the source location $v_s$ is on route $r_0$, and the destination location $v_t$ is on route $r_3$. During round 1, using the technique described above with respect to the method 200, only the routes having $v_s$ are analyzed; thus only route $r_0$ is analyzed. During round 2, all the routes that had stops during round 1 are analyzed; thus routes $r_0$, $r_1$, and $r_2$ are analyzed. During round 3, all the routes that had stops during round 2 are analyzed; thus routes $r_0$, $r_1$, $r_2$, and $r_3$ are analyzed. The destination location $v_t$ resides on route $r_3$, and thus the analysis may stop after round 3.

To process the route, its stops are visited in order until a stop $v_i$ is determined such that $et(r, v_i)$ is defined. This is when the route can be "hopped on". Let the corresponding trip t be the current trip for r, and keep traversing the route. For each subsequent stop $v_j$, $\tau_k(v_j)$ is updated using this trip. Moreover, the current trip for r may be updated: at each stop $v_i$ along r it may be possible to catch an earlier trip (for example, because a quicker path to $v_i$ using a different route has been found already). Thus, check if $\tau_{k-1}(v_i) < arr(t, v_i)$ and update t by recomputing $et(r, v_i)$.

Note that the approach can also be extended to deal with circular routes by linking the last stop of such a route with its first one. By this, a route is traversed until a full cycle is performed with no improvements.

In an implementation, the number of routes visited during each round may be limited. In particular, there is no need to traverse routes that cannot be reached by the previous round, since there is no way to "hop on" to any of its trips. More precisely, instead of looping through all routes during round k, it suffices to traverse only routes that contain at least one stop reached with exactly k–1 trips. For example, consider a route whose last improvement happened at round k'<k–1. The route was visited again during round k'+1<k, and no stop along the route improved. There is no point in traversing it again until at least one of its stops improves due to some other route.

Figure 6:
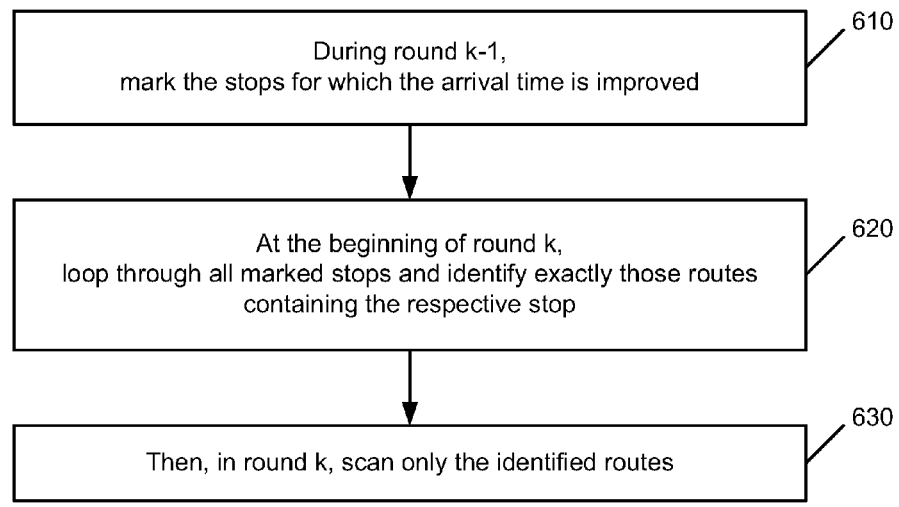
FIG. 6 is an operational flow of another optimization that may be used in an implementation of a method of determining journeys in public transportation networks.

FIG. 6 is an operational flow of another optimization that may be used in an implementation of a method 600 of determining journeys in public transportation networks. At 610, mark during round k–1 those stops $v_i$ for which the arrival time $\tau_{k-1}(v_i)$ was improved. At 620, at the beginning of round k, loop through all marked stops and find exactly those routes containing the respective stop, accumulating them in a set Q. Then, only routes from Q have to be considered for scanning in round k, at 630.

Since the set of marked stops exactly corresponds to those stops at which a trip is potentially "hopped on" in round k, a route only has to be traversed beginning at the earliest marked stop contained in the route. More precisely, when adding a route r to Q while looping through the marked stops, keep the earliest (marked) stop of r within Q (potentially updating it). Then, it suffices to scan r beginning with its associated earliest stop.

Thus, scanning a route starts at the earliest marked stop. Therefore, using this optimization in the routes of FIG. 5 for example, route $r_0$ is scanned in round 1 as described above, but for round 2, only the portions of routes $r_1$ and $r_2$ that extend from the earliest marked stop (e.g., stop 510 for route $r_1$ and stop 520 for route $r_2$) are analyzed. The earlier stops in those routes (e.g., stops 502 and 503 in route $r_1$, and stops 518 and 519 in route $r_2$) are not analyzed because they were not reached by route $r_o$ in the earlier round. Similarly, in round 3, the route $r_3$ beginning at stop 530 is analyzed, because stop 528 of route $r_3$ was not reached in the earlier rounds.

As described above, the technique of FIG. 2, for example, stops after K rounds. In an implementation, a tighter criterion may be implemented to halt processing immediately after a round k in which no stop is marked, i.e., in which $\tau_k(v) = \tau_{k-1}(v)$ for all v. This means there has been no improvement in the round.

In an implementation, local pruning may be used as an acceleration technique. That is, for each stop $v_i$, keep a value $\tau^*(v_i)$ representing the earliest known arrival time at $v_i$. Since only Pareto optimal paths are to be retained, only mark a stop during route traversal at round k when the arrival time with k−1 trips is earlier than $\tau^*(v_t)$.

Additional pruning is possible when computing point-to-point paths. In this case, interest is focused on computing the Pareto optimal journeys between two stops $v_s$ and $v_t$. During round k, there is no need to mark stops whose arrival times are greater than $\tau^*(v_t)$ (the best known arrival time at $v_t$).

In an implementation, the technique can be extended to work in parallel. A portion of the technique consists of processing individual routes in no particular order. If several CPU cores are available, each can handle a different subset of the routes. During round k, however, multiple cores may attempt to write simultaneously to the same memory position $\tau_k(v)$, so appropriate care must be taken to ensure correctness. Well-known techniques, such as locks or transactions, can be used.

For performance reasons, the use of such coordination primitives (such as locks) should be minimized, since they can be costly. In particular, if all routes containing stop v are assigned to the same core, there is no need to protect the memory position corresponding to $\tau_k(v)$. This should be taken into account when partitioning the routes among cores: one should minimize the number of stops that are assigned to more than one core.

As noted above, the technique finds optimal solutions to the EABT problem: given a starting time $\tau$, it finds a journey with the earliest possible arrival time $\tau'$ at the destination $v_t$ with bounded transfers. Note, however, that there may be several journeys that leave the source $v_s$ at time $\tau$ (or later) and arrive at $v_t$ at time $\tau'$. In some applications, it may be preferable to have the one that minimizes the journey time, i.e., the journey that leaves $v_s$ as late as possible (while still arriving at $\tau'$).

In an implementation, this version of the problem can be solved by running the algorithm multiple times. The first run is a forward search from $v_s$ to $v_t$ leaving at time $\tau$, as described above. It finds for every k the earliest possible arrival time $\tau'_k$. Then, for each k, run a reverse search, starting at $v_t$ at time $\tau'_k$ and having $v_s$ as a target. The algorithm is the same as described above, but going backwards in time. This will find the latest departure time $\tau''_k$ at $v_s$ for having at most k trips. Note that to obtain $\tau''_k$ it is sufficient to limit the number of rounds in the reverse search to k.

In another implementation, if this multi-step approach is too costly (e.g., because running the algorithm K+1 times is too expensive), a heuristic alternative may be used. First, run the standard algorithm to find a candidate journey J. This journey corresponds to a sequence of trips. Then, in a post-processing step, traverse J in reverse order (from the last trip to the first), replacing each trip by the latest possible feasible trip in the same route. Although this is not guaranteed to find a result as good as that found by running multiple full searches, it may find a good enough alternative in practice.

Figure 7:
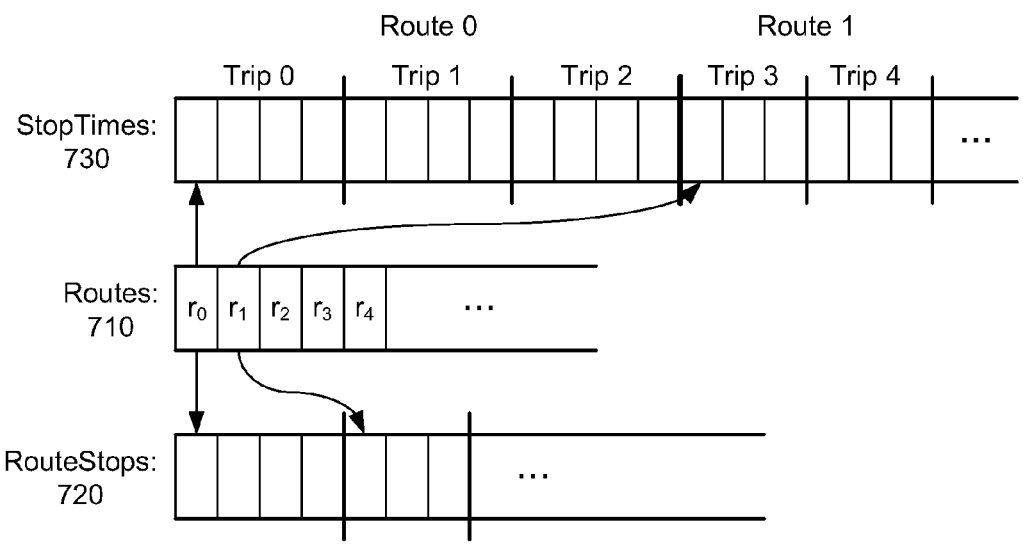
FIG. 7 is an illustration of an example data structure that may be used in the determination of journeys in public transportation networks.

Data structures can be implemented for use with the techniques described above. In an implementation, the routes, trips, and stops have sequential integral identifiers, each starting at 0. FIG. 7 is an illustration of an example data structure 700 that may be used in the determination of journeys in public transportation networks. As described above, routes are traversed. For route i, its sequence of stops (in order) is used, as well as the list of all trips (from earliest to latest) that follow the route. In an implementation, an array Routes 710 may be stored where the i-th entry holds information about route $r_i$. For example, it may store the number of trips associated with $r_i$, as well as the number of stops in the route (which is the same for all its trips). Moreover, it may store pointers to lists.

In an implementation, a pointer in Routes[i] is to a list representing the sequence of stops made along route $r_i$. Instead of representing each list of stops separately (one for each route), they may be grouped into a single array RouteStops 720. RouteStops 720 may first contain the sequence of stops of route 0, then those for route 1, and so on. The pointer in Routes[i] is to the first entry in RouteStops 720 that refers to route i.

Another pointer in Routes[i] is to a representation of the list of trips that actually follow the route. Instead of maintaining separate lists for different routes, a single array StopTimes 730 may be used. StopTimes 730 may be divided into blocks, and the i-th block contains all trips corresponding to route $r_i$. Within a block, trips are sorted by departure time (at the first stop). Each trip is just a sequence of stop times, each represented by the corresponding arrival and departure times. Note that for each trip the stop times corresponding to the first/last stop have only departure/arrival time set, respectively.

A route $r_i$ can be processed by traversing the stops in RouteStops 720 associated with $r_i$. To find the earliest trip departing from some stop v along the route after some time $\tau$, the stop times can be accessed of all trips at $r_i$ at v in constant time per trip because of the way StopTimes 730 was sorted. In particular, if when processing $r_i$ trip t is already being used, the arrival time of the next stop is determined by the subsequent entry in StopTimes 730. Furthermore, to check if an earlier trip improves $r_i$, jump r (=length of the route $r_i$ as stored in Routes 710) entries to the left to get to the journey of the next earlier trip.

Figure 8:
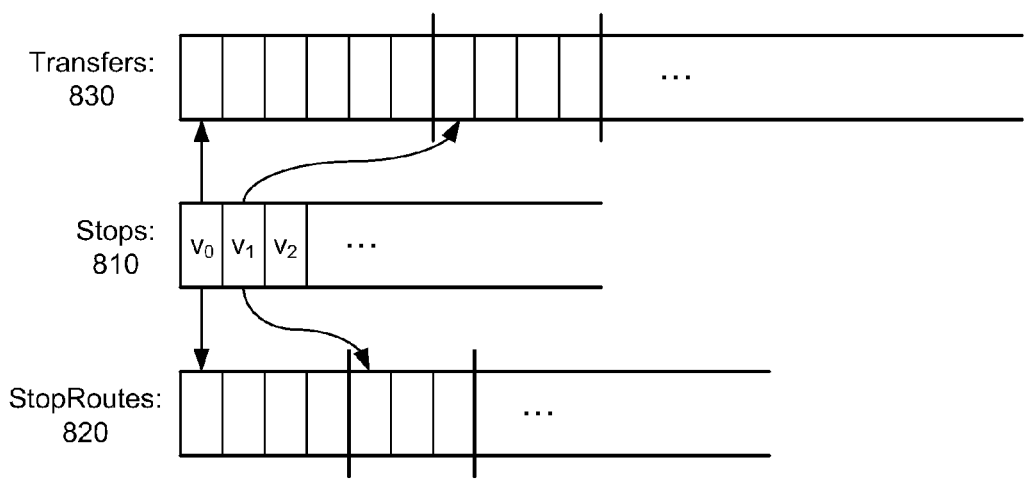
FIG. 8 is an illustration of another example data structure that may be used in the determination of journeys in public transportation networks.

Some additional operations are supported. In an implementation, for those additional operations, an array Stops 810 is used, which contains information about each individual stop. FIG. 8 is an illustration of another example data structure 800 that may be used in the determination of journeys in public transportation networks. In particular, for each stop $v_i$, the list of all routes that go through that stop is stored—in an implementation, this may be used for the marking routine described above (e.g., with respect to the method 600 of FIG. 6). Moreover, the list of all transfers that can be made out of $v_i$, together with their corresponding transfer times, is maintained. As before, these two sets of lists are aggregated in two arrays. An array StopRoutes 820 contains the lists of routes associated with each stop: first the routes associated with $v_0$, than those associated with $v_1$, and so on. Moreover, each entry of StopRoutes stores the order of the associated stop on the respective route. This is used for quickly computing the earliest stop along the route from which traversal of the route has to start in the next round of the algorithm. Similarly, an array Transfers 830 represents the allowed transfers from $v_0$, followed by the allowed transfer from $v_1$, and so on. Each individual transfer from $v_i$ is represented by its target stop $v_j$ together with the transfer time $l(v_i, v_j)$. The i-th entry in Stops 810 points to the first entries in StopRoutes 820 and Transfers 830 associated with stop $v_i$.

To support retrieval of the actual journeys (and not just the arrival times and numbers of transfers), an implementation associates additional fields with each label $t_k(v)$, representing the k'th trip on the journey and the stop where this trip was "hopped" on. To retrieve the actual journey, following these "parent pointers" yields the corresponding trips (from last to first).

Figure 9:
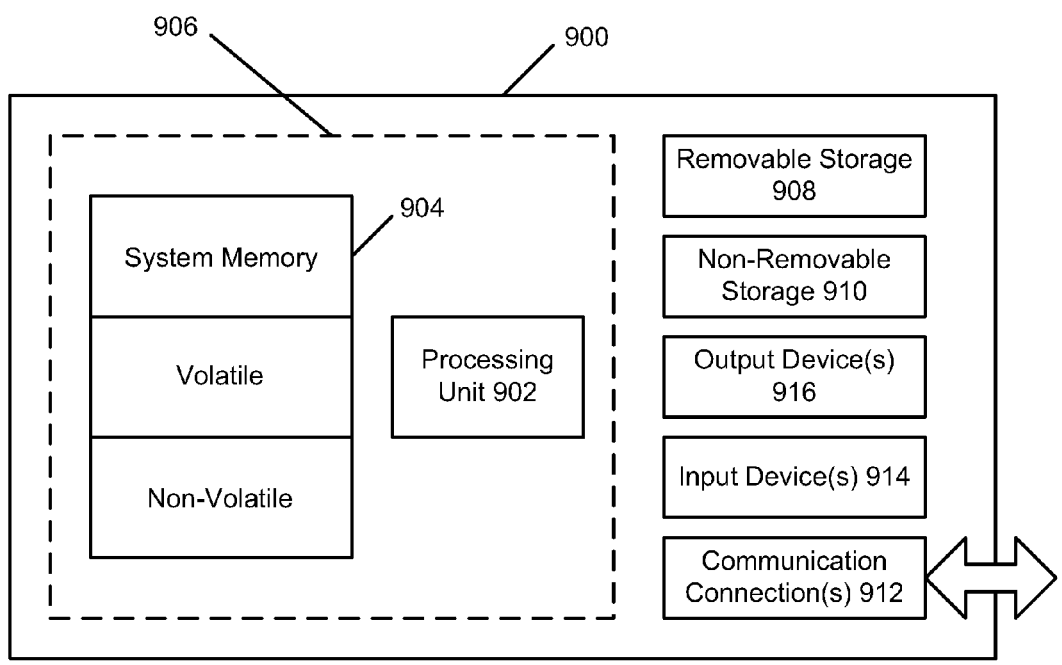
FIG. 9 shows an exemplary computing environment.

FIG. 9 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by computing device 900 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   receiving as input, at a computing device, data pertaining to a public transportation network that includes a plurality of stops;
   performing, by the computing device, upon receiving a query, a Pareto optimal journey computation between a first stop and a second stop of the plurality of stops, wherein the first stop is a source location and the second stop is a destination location, and wherein the Pareto optimal journey computation is subject to criteria that minimize a travel time and minimize a number of transfers while excluding a preprocessing phase prior to receiving the query, the excluding of the preprocessing stage directed at accommodating, when present, one or more dynamic conditions in the network that has an impact upon at least one trip; and
   outputting at least one Pareto optimal journey, if one exists, between the source location and the destination location, by the computing device.

2. The method of claim 1, wherein performing the Pareto optimal journey computation between the first stop and the second stop comprises performing a plurality of rounds on the network, each round of the plurality of rounds determining an optimal journey from the first stop to every other stop on the network that is reachable using a predetermined number of trips.

3. The method of claim 2, further comprising receiving an integer representing a maximum number of trips, wherein the plurality of rounds is based on the integer representing the maximum number of trips, with each round corresponding to a different number that is not greater than the maximum number of trips.

4. The method of claim 3, wherein the predetermined number of trips for each round is equal to the different number corresponding to each round.

5. The method of claim 2, wherein performing each round comprises:
   determining an arrival time for each transportation stop corresponding to the reachable stops on the network using the predetermined number of trips; and
   setting a label for each of the reachable stops with the earliest determined arrival time.

6. The method of claim 1, wherein the query identifies the source location, the destination location, and a departure time.

7. The method of claim 1, wherein performing the Pareto optimal journey computation between the first stop and the second stop comprises performing a plurality of rounds on the network, wherein each of the plurality of rounds iterate over a plurality of trips that is reachable using a predetermined number of transfers.

8. The method of claim 1, wherein performing the Pareto optimal journey computation between the first stop and the second stop comprises performing a plurality of rounds on the network, wherein each of the plurality of rounds iterate over a plurality of routes that is reachable using a predetermined number of transfers.

9. The method of claim 8, further comprising limiting the routes iterated over in each round by traversing only the routes that are reached by a previous round.

10. The method of claim 1, wherein the at least one Pareto optimal journey between the source location and the destination location comprises an earliest possible arrival time with a total number of transfers performed in the journey less than a predetermined number.

11. A method, comprising:
   receiving, at a computing device, a query comprising a source location in a public transportation network, a destination location in the public transportation network, and a departure time;
   performing, at the computing device, a plurality of rounds a using data representing the public transportation network that includes a plurality of stops, wherein a first stop is associated with the source location and a second stop is associated with the destination location, and wherein performing each round comprises:
      setting an upper bound on an earliest arrival time for each stop that is reachable with a predetermined number of trips in the round, taking into account one or more delays or cancellation of service if present; and
      processing each trip of a plurality of trips in the round, by visiting each stop in the trip from earliest to latest, wherein the earliest is the first stop in the trip having a departure time within the trip that is at least as late as the arrival time for that stop in the previous round, if such a stop exists, and for each subsequent stop in the trip, setting the arrival time at the stop to the minimum of the arrival time and the previously set upper bound; and
   determining at least one journey plan between the source location and the destination location, based on the rounds performed by the computing device.

12. The method of claim 11, wherein performing each round further comprises, for each transfer in the trip, determining the transfer time and using the transfer time in the determination of the at least one journey plan, wherein each transfer is an interchange.

13. The method of claim 11, wherein determining the at least one journey plan uses criteria that minimize a travel time and minimize a number of transfers, and wherein the at least one journey plan between the source location and the destination location comprises an earliest possible arrival time with a total number of transfers performed in the journey less than a predetermined number.

14. The method of claim 11, further comprising receiving an integer representing a maximum number of trips, wherein the plurality of rounds is based on the integer representing the maximum number of trips, with each round corresponding to a different number that is not greater than the maximum number of trips.

15. The method of claim 11, wherein the query identifies the source location, the destination location, and the departure time.

16. A method, comprising:
   performing, by the computing device, upon receiving a query, a path computation between a source location and a destination location in a transportation network using a predetermined departure time or a predetermined arrival time, wherein the path computation comprises minimizing travel time and eliminating of a preprocessing stage prior to receiving the query, the eliminating of the preprocessing stage directed at accommodating dynamic conditions in the transportation network after receiving the query; and
   outputting at least one journey plan between the source location and the destination location, by the computing device.

17. The method of claim 16, wherein the path computation further comprises performing a plurality of rounds on a data structure representing a plurality of stops in the transportation network, each round of the plurality of rounds directed at determining a path from a stop associated with the source location to every other stop that is reachable using a predetermined number of trips, until a stop associated with the destination location is reached, the number of rounds based on a maximum number of transfers indicated in the query, each round using a different number of transfers up to the maximum number of transfers.

18. The method of claim 16, wherein the path computation precludes use of Dijkstra's algorithm, and further wherein outputting the at least one journey plan comprises outputting at least one Pareto optimal path between the source location and the destination.

19. The method of claim 16, wherein the path computation further comprises using a schedule-based timetable, and takes into consideration a plurality of transfers between the source location and the destination location.

20. The method of claim 11, wherein determining the at least one journey plan comprises identifying at least one Pareto optimal path, and precludes use of Dijkstra's algorithm.

* * * * *